(12) United States Patent
Wong et al.

(10) Patent No.: US 7,042,483 B2
(45) Date of Patent: *May 9, 2006

(54) APPARATUS AND METHOD FOR PRINTING USING A LIGHT EMISSIVE ARRAY

(75) Inventors: Victor C. Wong, Rochester, NY (US); Robert V. Reisch, Fairport, NY (US); Robert Breslawski, Brockport, NY (US); Vishwas G. Abhyankar, Pittsford, NY (US); Robert S. Jones, Rochester, NY (US); Donald R. Williams, Williamson, NY (US); Robert B. Bayley, Hilton, NY (US); Badhri Narayan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 10/385,325

(22) Filed: Mar. 10, 2003

(65) Prior Publication Data

US 2004/0179088 A1    Sep. 16, 2004

(51) Int. Cl.
*B41J 2/45* (2006.01)

(52) U.S. Cl. ..................................... 347/238

(58) Field of Classification Search ........ 347/234–235, 347/236–240, 247–254, 255, 262, 264, 130–132, 347/134; 348/231.9, 750; 355/40; 359/321; 399/370, 2–7; 378/162; 345/82; 250/559.24; 358/401, 509
See application file for complete search history.

(56) References Cited

U.S. PATENT DOCUMENTS

| | | | |
|---|---|---|---|
| 4,728,965 A | 3/1988 | Kessler et al. | 347/241 |
| 4,754,334 A | 6/1988 | Kriz et al. | 386/130 |
| 4,897,639 A * | 1/1990 | Kanayama | 345/82 |
| 4,897,672 A * | 1/1990 | Horiuchi et al. | 347/236 |
| 4,972,235 A * | 11/1990 | Iwamoto et al. | 399/370 |
| 5,061,049 A | 10/1991 | Hornbeck | 359/224 |
| 5,296,958 A | 3/1994 | Roddy et al. | 359/204 |
| 5,303,056 A | 4/1994 | Constable | 386/130 |
| 5,461,411 A | 10/1995 | Florence et al. | 347/240 |
| 5,629,529 A * | 5/1997 | Motoyama | 250/559.24 |
| 5,652,661 A | 7/1997 | Gallipeau et al. | 358/302 |
| 5,818,546 A * | 10/1998 | Opower et al. | 348/750 |
| 5,859,658 A | 1/1999 | Hammond | 347/238 |
| 6,037,973 A | 3/2000 | DiGiulio et al. | 348/96 |
| 6,039,481 A | 3/2000 | Ham | 400/708 |
| 6,072,517 A | 6/2000 | Fork et al. | 347/237 |
| 6,072,596 A * | 6/2000 | Hattori et al. | 358/401 |
| 6,133,984 A * | 10/2000 | Deguchi et al. | 355/40 |
| 6,137,523 A | 10/2000 | Fork | 347/237 |
| 6,188,420 B1 * | 2/2001 | Kuribayashi et al. | 347/132 |

(Continued)

FOREIGN PATENT DOCUMENTS

EP    1008453 A2    6/2000

(Continued)

*Primary Examiner*—Hai Pham
(74) *Attorney, Agent, or Firm*—Nelson Adrian Blish

(57) ABSTRACT

An apparatus and method for printing images from a digital image source onto a photosensitive medium (22) using one or more two-dimensional light-emissive arrays (51) such as OLED arrays. Each image pixel has a corresponding light-emitting element which is assigned a variable intensity based on data for that pixel. Imaging optics (58) direct the light from each light-emitting element onto the photosensitive medium (22) so that a monochromatic or multicolor image can be formed with a single exposure.

76 Claims, 6 Drawing Sheets

U.S. PATENT DOCUMENTS

| | | | |
|---|---|---|---|
| 6,195,115 B1 | 2/2001 | Yamaguchi | 347/238 |
| 6,215,547 B1 | 4/2001 | Ramanujan et al. | 355/67 |
| 6,243,125 B1 | 6/2001 | Yuge et al. | 347/241 |
| 6,288,743 B1 * | 9/2001 | Lathrop | 348/231.9 |
| 6,356,380 B1 * | 3/2002 | Whitney | 359/321 |
| 6,580,490 B1 * | 6/2003 | Wong et al. | 355/40 |
| 6,677,971 B1 | 1/2004 | Sasaki | 347/239 |
| 6,687,028 B1 * | 2/2004 | Kasahara et al. | 358/509 |
| 6,803,939 B1 * | 10/2004 | Shimizu et al. | 347/238 |
| 2002/0063772 A1 | 5/2002 | Sasaki | |
| 2003/0053598 A1 * | 3/2003 | Sumi et al. | 378/162 |

FOREIGN PATENT DOCUMENTS

| | | |
|---|---|---|
| EP | 1 176 803 A1 | 1/2002 |
| JP | 10-193670 | 7/1998 |
| JP | 2001-246780 | 9/2001 |

* cited by examiner

APPARATUS AND METHOD FOR PRINTING USING A LIGHT EMISSIVE ARRAY

FIELD OF THE INVENTION

The present invention relates to an apparatus and method for printing images from digital image sources onto a photosensitive medium using a two-dimensional light emissive array.

BACKGROUND OF THE INVENTION

A number of different imaging technologies have been employed for recording images from digital data onto photosensitive media. Conventional printing apparatus adapted for this purpose have used Cathode Ray Tubes (CRTs), scanned laser beams, Liquid Crystal Displays (LCDs), and Digital Micromirror Devices (DMDs). Each of these technologies, at its current level of maturity, is known to have inherent limitations.

In a CRT-based printer, digital image data is used to modulate a cathode ray tube which provides exposure energy by scanning an electron beam of variable intensity along its phosphorescent screen. CRT systems such as that described in U.S. Pat. Nos. 4,754,334 and 5,303,056 are relatively large and slow. Other problems such as non-uniform illumination, geometric distortion, complexity, cost, and size are among the more serious constraints of CRT-based printing approaches.

Alternately, light exposure energy can be applied from a laser-based printer, as is disclosed in U.S. Pat. No. 4,728,965. In a laser-based printer, digital image data is used to modulate laser on-time duration or intensity as the beam is scanned onto the imaging plane by a rotating polygon, or scanner. The scanner builds an image one pixel at a time. Limitations in systems using laser scanners, such as that described in U.S. Pat. No. 5,296,958, are due primarily to limitations in scanner speed. For increased speed, the raster scan system must be relatively complex in its construction. There are practical limitations in how laser scanner systems can be scaled in order to gain speed. The need for special media presents another limitation for usefulness of these systems. Other limiting problems with laser scan solutions include geometric distortion, complexity, and cost.

Spatial light modulators present another alternative imaging solution. A spatial light modulator can be considered essentially as a one-dimensional (linear) or two-dimensional (area) array of light-valve elements, each element corresponding to an image pixel. Spatial light modulators have been developed and used for relatively low resolution applications such as digital projection systems and for image display in portable devices such as helmet-mounted displays. One type of two-dimensional or area spatial light modulator being widely used in image projection applications is the DMD from Texas Instruments, Dallas, Tex. However, the resolution currently available with digital micromirror devices, as shown in U.S. Pat. Nos. 5,061,049 and 5,461,411, is not sufficient for high-quality printing needs such as for photographic prints or for motion picture film, for example. In practice, the requirements for projection and display differ significantly from the requirements for high resolution printing to a photosensitive medium, as would be required, for example, for motion pictures, for medical imaging, for micrographics, or for commercial photography. There appears no clear technology path for providing increased DMD resolution. Moreover, DMDs are expensive and are not easily scaled to higher resolution.

Another type of spatial light modulator being used in projection and printing applications is the two-dimensional LCD. Examples of printing apparatus using LCD spatial light modulators are disclosed in commonly-assigned U.S. Pat. Nos. 5,652,661 and 6,215,547. There are two basic types of LCD spatial light modulators currently in use, transmissive and reflective. Both types of LCD components modulate an incident optical beam for imaging by modulating the polarization state of the light. Polarization considerations are, therefore, important in the overall design of support optics for LCD spatial light modulators. Illumination optics must be adapted to provide highly uniform levels of intensity, with light at the proper polarization for modulation. This adds cost and complexity to the design of a printing apparatus using LCD components.

A recent development which offers considerable promise for both large-scale displays and small, handheld microdisplays is Organic Light-Emitting Diode (OLED), using organic electroluminscence technology. The light emitting material itself may be characterized as being of the small-molecule kind or of the polymer kind. In some of the current literature, small-molecule organic electroluminescent devices are labeled as "OLED" devices and distinguished from polymer organic electroluminescent devices, labeled "PLED" devices. For the purposes of this application, however, all of these classes of organic electroluminescent devices, including both small-molecule and polymer varieties, are simply referred to as "OLED" and can be considered for use as an electroluminescent image source. Individual OLEDs have been integrated on the same substrate to form high resolution area arrays. An organic light emitting diode array can be fabricated as a two dimensional monochromatic array of pixels or as a tri-color side by side pixel array, or even as a tri-color stacked pixel array. The array sizes, pixel pitch and aspect ratios can be manufactured in a variety of resolutions and densities. Each pixel site in a tri-color side by side or stacked array comprises three light emitting diodes of different colors. Each light emitting diode in a tri-pixel site, and therefore the entire array, can be individually controlled to create a full-color visual image. Alternately, three monochromatic arrays, each of different color, can be combined to provide the three component colors needed for a full-color visual image.

In contrast to LCD and other types of light modulators, which require an external illumination source with supporting optics and, in many cases, supporting polarization components, OLED arrays emit modulated light directly. Thus, when using OLED arrays, supporting illumination and polarization optics are not needed. This makes OLED devices particularly advantageous for use in display applications.

As is well known to those skilled in the imaging arts, imaging requirements for display differ significantly from imaging requirements for printing. Displays are optimized to provide maximum luminous flux to a screen, with secondary emphasis placed on characteristics important in printing, such as contrast and resolution. Optical systems for display applications are designed for the response of the human eye, which, when viewing a display, is relatively insensitive to image artifacts and aberrations and to image non-uniformity, since the displayed image is continually refreshed and is viewed from a distance. However, when viewing printed output from a high-resolution printing system, the human eye is not nearly as "forgiving" to artifacts and aberrations and to non-uniformity, since irregularities in optical response are more readily visible and objectionable on printed output. For this reason, there can be considerable complexity in optical systems for providing a uniform exposure energy for printing. Even more significant are differences in resolution requirements. Adapted for the human eye, display systems are optimized for viewing at typical resolutions such as 72 dpi or less, for example. Printing apparatus, on the other hand, must achieve much higher resolution, particularly apparatus designed for micrographics applications, which can be expected to provide 8,000 dpi for some systems. This places significantly different requirements on supporting optics for printing systems.

Primarily due to the emphasis on OLED use for display applications, there is, as yet, only limited interest in using OLED devices with printing systems. For example, U.S. Pat. No. 6,195,115 teaches the use of a linear array of OLED elements in the exposure head of color printers. In U.S. Pat. Nos. 6,072,517 and 6,137,523, a xerographic printhead incorporates an OLED area array but in a linear printing scheme, where light from multiple OLED elements in the same column are integrated to provide grayscale exposure for a single pixel. In both of U.S. Pat. Nos. 6,195,115 and 6,137,523 disclosures, OLEDs are used to print data one line at a time. Such systems not only have limited productivity, but also require precision media transport and synchronized data electronics, both of which could be complex and costly.

The OLED-based printing systems disclosed in U.S. Pat. No. 6,195,115 and U.S. Pat. Nos. 6,072,517 and 6,137,523 are directed to linear printing, in which a single line at a time is exposed as a photosensitive medium is moved through the print area. However, this type of printing fails to take advantage of the capability of the OLED emissive array to emit light for a full image frame at a time. With conventional linear printing, throughput is constrained and media transport systems become an important part of the imaging chain and are, therefore, more complex and costly. Moreover, simultaneous printing of multiple images is not possible with conventional linear techniques. Conventional linear printing techniques are also constrained with respect to image size and resolution.

U.S. Pat. No. 6,243,125 and European Patent Application EP 1 008 453 disclose a portable optical printer that employs two linear rows of luminous dots for providing exposure; the printhead is moved relative to the media in a direction perpendicular to the fluorescent luminous array to print a two-dimensional image. Just like the aforementioned U.S. Pat. Nos. 6,195,115; 6,072,517; and 6,137,523 disclosures, U.S. Pat. No. 6,243,125 and European Patent Application EP 1 008 453 are constrained in productivity and are disadvantaged in requiring complex and expensive media transport systems. Furthermore, the printhead disclosed in U.S. Pat. No. 6,195,115 provides only 1× imaging.

Thus, it can be seen that while CRT, LCD, laser, and other technologies have provided solutions for printing images from digital data onto photosensitive media, there is room for improvement. The use of two-dimensional emissive arrays, such as OLEDs, in a printing configuration in which a full image frame is printed at one time offers a possible printing solution with potential advantages over other printer technologies. However, there are, as yet, no guidelines for how to integrate OLED image-forming devices into an apparatus for printing on photosensitive media, where the printing apparatus provides, with sufficient throughput, a high-quality, high-resolution print output in a range of possible image formats.

Thus, it can be seen that there is a need for a printing apparatus that takes advantage of the full-frame imaging capability of the OLED for improved throughput, increased image format possibilities, improved image resolution, and improved capabilities for increased image size.

SUMMARY OF THE INVENTION

It is therefore an object of the preferred invention to provide an imaging method and apparatus for printing onto a photosensitive medium using, a two-dimensional Organic Light Emitting Diode (OLED) array. With this object in mind, the present invention provides an apparatus for printing an image from digital data onto a photosensitive medium, the apparatus comprising:

(a) a control logic processor for accepting an image data input stream and providing image pixel data for a two-dimensional image;

(b) a light emissive array for forming a two-dimensional exposure image according to the image pixel data, the light emissive array comprising a plurality of individual light-emitting elements arranged in multiple rows and columns, wherein each light-emitting element corresponds to a pixel in the image pixel data, the intensity of each light emitting element varying according to the digital data value for each pixel;

(c) imaging optics for directing the two-dimensional exposure image onto the photosensitive medium.

In another embodiment, the present invention provides an apparatus for printing a plurality of images from digital image pixel data onto a photosensitive medium, the apparatus comprising:

(a) a control logic processor for accepting an image data input stream and providing image pixel data for at least one two-dimensional image;

(b) a first light emissive array for forming a first exposure image according to the digital image pixel data;

(c) a second light emissive array for forming a second exposure image according to the digital image pixel data; wherein the first and second light emissive arrays each comprise a plurality of individual light-emitting elements arranged in multiple rows and columns, wherein each light-emitting element corresponds to a pixel in the digital image pixel data, the intensity of each light emitting element varying according to the digital data value for each pixel;

(d) first imaging optics for directing the first exposure image onto the photosensitive medium; and (e) second imaging optics for directing the second exposure image onto the photosensitive medium.

It is a feature of the present invention that it uses OLED area array components in any of a number of configurations for monochromatic or polychromatic imaging on photosensitive media.

It is a further feature of the present invention that it provides methods for combining modulated light from multiple light emissive arrays to increase image resolution, to increase image size, and to enhance productivity. The present invention also provides OLED-based printing without the requirement for complex and costly media transport and data synchronization needed for linear OLED printing systems.

It is an advantage of the present invention that it simplifies the design of a printing apparatus for photosensitive media. The same component effectively serves as the emitter and modulator of exposure energy, providing the modulated light that forms the image. The system also eliminates the need for integrating bars and other uniformizers, polarizing components, and distortion correction optics, for example. This helps to lower cost, simplify the design, and reduce the size of a digital printing apparatus.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 11a–11d illustrate the effect of dithering a two-dimensional emissive array using four distinct image positions.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
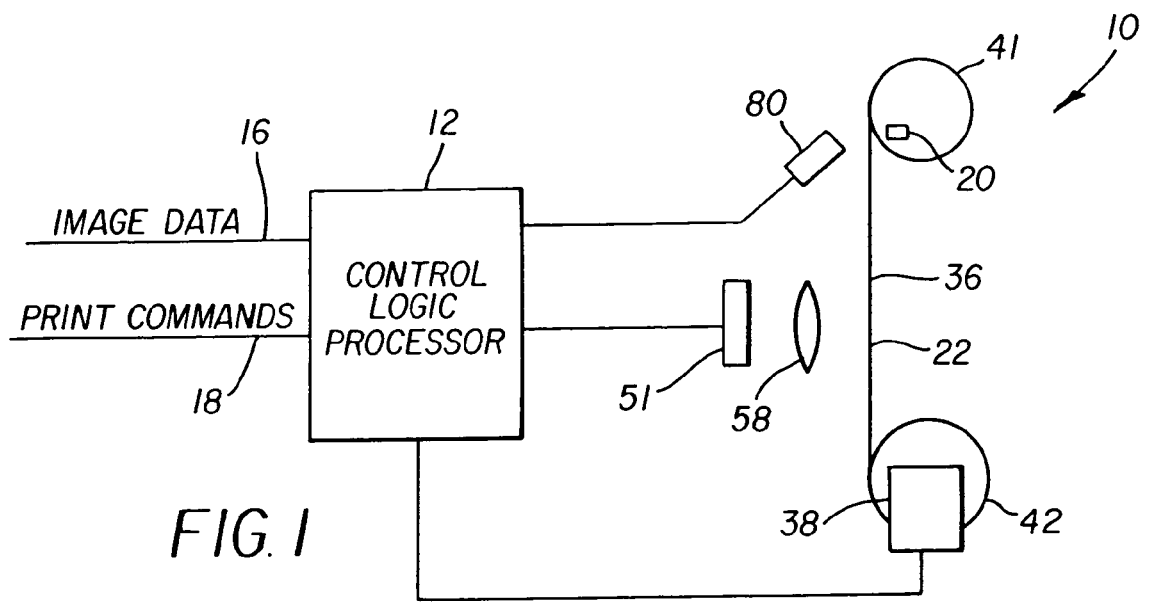
FIG. 1 is a schematic diagram of an apparatus for printing image frames in accordance with the present invention.

Referring now to FIG. 1 there is shown a printing apparatus 10 of the present invention for imaging onto a photosensitive medium 22. Photosensitive medium 22 is supplied from a media supply canister 41. A media transport apparatus 38 guides photosensitive medium 22 through an exposure area 36. Photosensitive medium 22 is exposed by a two-dimensional emissive array 51, through imaging optics 58. In one embodiment, two-dimensional emissive array 51 is a two-dimensional OLED array. Exposed photosensitive medium 22 is then fed into a media take-up canister 42 for its protection until further processing. A sensor 80 is provided for detecting dimensional information about photosensitive medium 22, such as a media width, for example. Sensor 80 may sense this dimension directly, that is, mechanically, or may sense an optional identifier 20 that is coupled to media supply canister 41 or to photosensitive medium 22 in some way. In a preferred embodiment, sensor 80 is an RF transceiver, such as one of the "Model S2000" transceivers, available from Texas Instruments, Inc., located in Dallas, Tex, USA. Alternatively, sensor 80 could be a "Model U2270B" transceiver, available from Vishay-Telefunken Semiconductors, Inc., located in Malvern, Penn., USA. Identifier 20 could be an "SAMPT" (Selective Addressable Multi-Page Transponder), part number "RI-TRP-IR2B" available from Texas Instruments, Inc. Alternatively, identifier 20 may be a "Model TL5550" transponder, available from Vishay-Telefunken Semiconductors, Inc. By way of example, but not of limitation, Table 1 lists some other possible identifier 20/sensor 80 combinations.

Dimensional information may also be obtained from an operator, such as using a computer-screen prompt or using a pushbutton or other conventional device for indicating an operator selection.

TABLE 1

Identifier 20 and Sensor 80 Possibilities

| Where identifier 20 has the form: | Sensor 80 could be: |
|---|---|
| Barcode or other optical encoding | Barcode reader or other optical reader, such as built-in or hand-held scanner. |
| Magnetically encoded strip | Magnetic strip reader |
| Memory device, such as an I-button, manufactured by Dallas Semiconductor Corp., Dallas, TX | I-button reader |

Image data manipulation is performed by a control logic processor 12, such as a dedicated, on-board computer or an external host computer. Control logic processor 12 receives image data stream 16 and print commands 18 for operation of printing apparatus 10. Control logic processor 12 provides pixel image data to two-dimensional emissive array 51 for exposure of at least one full image frame at a time. Control logic processor 12 also accepts an input signal from sensor 80 as feedback data for control of media transport apparatus 38.

A digital color image frame comprises one or more visual image planes each of which is a two-dimensional array of pixels which defines the aperture as having a specific size, depending on photosensitive media type. For example, the SMPTE 59-1998 standard defines the apertures used on 35 mm motion picture film. Each pixel is created on photosensitive medium 22 based on digital data from one or more of the separable color records corresponding to one or more of three separable color image planes. In the case of a black and white images intended for black and white photosensitive medium 22, there is only one monochromatic image plane; therefore only one data file record is required. For conventional color images, there are generally three data file color records and three corresponding image planes on photosensitive medium 22. Each color record defines the densities of the pixels for that color plane. Density might be measured, for example, using measurement standards such as Status M, Status A, or printing density, depending on the types of photosensitive medium 22 to be used. The density of each color in a pixel can be represented by a value having some degree of density resolution, which is referred to as the color bit depth. Typically, this resolution can be represented by a digital value of n bits. An 8-bit value, with a bit depth of 8, can express any one of 256 discrete density levels; a 10-bit value can express 1024 discrete density levels. For example, typical bit depth for monochrome medical images is 12-bits, while for color photographic images is 24-bits (8-bit for each color plane).

Control logic processor 12 typically contains or controls a frame store that acts as a buffer for storing each separable color record of a frame. Control logic processor 12 can also control image processing utilities that perform various functions, such as resize utilities for resizing the digital image to increase or decrease the physical aperture size on the medium. Another process known as aperture correction can be applied by control logic processor 12 to correct pixel defects that can occur in transmission of the digital image data. Aperture correction utilities may also be used to sharpen or blur the image. Color correction software, under the control of control logic processor 12, may perform a color correction step on the digital image data. Color correction may be needed to print the same image onto different stock or using different batches of photosensitive medium 22. Color correction can alternately be used to compensate for the spectral sensitivity of photosensitive medium 22. In some cases, image data is manipulated, under the control of control logic processor 12, to achieve some special effects in the color mix of the image. Tone scale calibration capabilities may also be provided by control logic processor 12 to correct for variability affecting imaging, such as conditions in the stock emulsion used for photosensitive medium 22, chemical processing of photosensitive medium 22, and variations within the emissive arrays and supporting optics. The digital image data may represent a flat field image, such as is often used for image analysis purposes, in which all pixels are driven at the same code value. When printed without tone scale calibration, a flat field image could have a relatively higher or lower density than what was defined in the digital image file. Tone scale calibration can also adjust image data prior to printing, using prior knowledge about the aforementioned printing variables in order to achieve the expected results. This capability helps to adapt the image on photosensitive medium 22 to meet the density and color requirements of the digital image data.

File conversion may also be needed in the imaging path. Digital image data 16 can be provided in one of many different standard formats (for example, TIFF, GIF, JPG, DPX, JPM). Most of these standard formats have additional data that carries information about the file structure and content. This can include information on compression, color bit depth, and color data order sequence, and may even include sub-sampled images. This additional information is separated from the image data early in image processing. It is possible to convert between many of these formats. Control logic processor 12 may also perform file conversion on the digital image file frames as they are received from storage to some internal format needed by the image processing sub-system.

The imaging area of two-dimensional emissive array 51 is a composite of pixel sites, in which the pixels can be selectively driven in groups to match the desired format and aspect ratio of an image frame. The number and spacing of pixel sites defines the native resolution of the device. Monochromatic OLED devices provide higher resolution because all pixel elements are used; digital data from a monochromatic record drives all the pixels. Full-color OLED devices readily available have resolutions of 852×600 full-color pixels or more. Each full-color pixel is made up of a grouping of three adjacent color pixels (one red, one green, and one blue); digital data from each color record turns on the pixels of the corresponding color.

It is very important in high resolution imaging applications that all pixel sites have uniform light output for each color channel over the full operating range. Ideally, each pixel sites in an OLED array provides identical light output at any given input data value over the full effective dynamic range, to within some specified tolerance. Otherwise, objectionable artifacts appear. For example, on motion picture film negative media, relative variations of only 0.002 density are objectionable to a human observer when the film is projected onto a screen. This small variation in film density can be the result of emission variations at pixel sites of no more than 0.5%.

To compensate for minor emission variations between OLED pixel elements, control logic processor 12 may apply predetermined correction factors, adjusting gain and offset for each pixel color element. Programmable Look-Up Tables (LUTs) provide one simple method to compensate for pixel-to-pixel variability.

To derive the correction factors for each OLED array element requires first printing a full aperture flat-field image on photosensitive medium 22, with no correction compensation applied to any array element. A flat-field image is a digital image wherein all pixels are driven at the same code value, preferably near mid-scale. The flat-field image on the medium is then digitized, using a high resolution scanner or microdensitometer for example, at the maximum image aperture size and resolution, to produce density data for each pixel in a color plane. A resulting uniformity data map digital file is created from which relative variations in light output levels for each emissive array element can be determined. The data is converted from log space (density) to linear space (intensity) and the median light output level is then determined. The correction factor for each pixel in a two-dimensional emissive array 51 is a percentage deviation from the median point of each pixel in a color frame. For printing an image, these correction factors are applied to the image data by driver/uniformity correction utilities, under control of control logic processor 12. Correction factors from a uniformity data map could be used to correct the image if applied to the digital image file directly while the data is in log space (density). This would require more processing time and digital file storage or modifications to the original digital image file, which may or may not be desirable.

The light output level correction values used by driver/uniformity correction utilities could vary as a function of the performance of each specific array element in each of two-dimensional emissive arrays 51 or as a function of the specific color plane. The light output level of each element in two-dimensional emissive array 51 is controlled by the density code value in a digital image file. It might be necessary, therefore, to provide numerous correction values where the number of correction values equal the product of the number of pixels in two-dimensional emissive array 51, the number of separable color planes, and the color bit depth of each pixel. Potentially, this represents a large number of discrete values that are stored on control logic processor 12 and provided for driver/uniformity correction at power up. However, there are a number of very efficient means for applying this type of image correction, well known in the imaging arts. The corrected image data is presented to two-dimensional emissive array 51 in accordance with the specific data interface requirements of the device.

The optimal arrangement for pixel control would allow variation of both the maximum light intensity output of each pixel element in two-dimensional emissive array 51 as well as of the time duration during which the pixel emits light. The product of the magnitude of the light intensity output and this time duration is known as the media exposure value. The log of the exposure value then determines the density of the images on the medium. The standard equation D=logH is commonly applied in color imaging to define this relationship, where D equals density and H equals exposure in lux-seconds. Controlling the magnitude and time limits the maximum density for each color plane. In this way, the intensity of each pixel for each color plane is controlled by two-dimensional emissive array 51.

In order to set the power output of each individual LED element in two-dimensional emissive array 51 to a specific value, a data profile of power output versus input code value for each color channel is generated and stored on control logic processor 12. Light power at exposure area 36 is sensed by a photosensor (not shown) temporarily placed at the image plane. As the light level is systematically varied, the light power level is read by the photosensor and stored by control logic processor 12. In this process, each color channel is set to maximum output, and the input code value is varied in discrete steps, from 0 to maximum, as light power for each step is recorded. The resulting transfer functions are then used by control logic processor 12 to arbitrarily set the maximum exposure levels of each color channel using an LUT or other data manipulation mechanism.

Still referring to FIG. 1, under program control from control logic processor 12, photosensitive medium 22 is positioned such that an unexposed area of photosensitive medium 22 is located in exposure area 36. Each record of an image frame activates two-dimensional emissive array 51 for a predetermined exposure time and power output level, which creates a latent image on photosensitive medium 22. Once an image frame has been exposed, the next unexposed area of photosensitive medium 22 is indexed into place in exposure area 36 and an exposure sequence is repeated. This process continues until exposure of photosensitive medium 22 is completed.

Two-dimensional emissive array 51 is electronically activated in response to the digital image signal from control logic processor 12. The image created is then formed by exposure onto photosensitive medium 22. Media transport system 38 indexes photosensitive medium 22 through exposure area 36 in a controlled manner, positioning photosensitive medium 22 precisely in an image bearing relationship to two-dimensional emissive array 51. Media transport system 38 includes conventional motor, drive, and tensioning mechanisms, well known in the photoprocessing arts, that controllably index photosensitive medium 22 from media supply canister 41, through exposure area 36, to media take-up canister 42 for processing. One exemplary apparatus suitable for providing a high speed precision media transport system 38 is disclosed in U.S. Pat. No. 6,037,973.

The apparatus of FIG. 1 can be generalized to provide a number of different embodiments for two-dimensional emissive array 51, as is shown in FIGS. 2–9 and described subsequently.

Single-Array Printing

Figure 2:
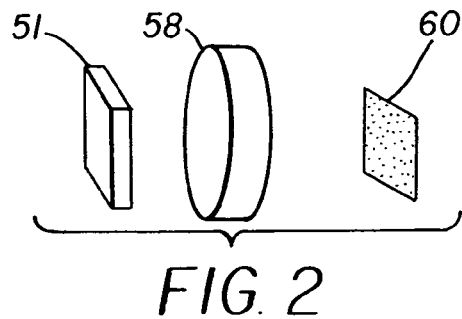
FIG. 2 is a perspective view showing a simple arrangement with a single emissive array.
Figure 3:
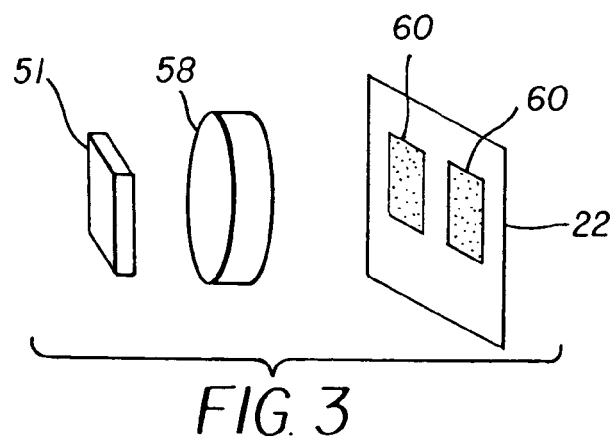
FIG. 3 is a perspective view showing a single emissive array capable of printing multiple side by side images.

Referring to FIGS. 2 and 3, a single two-dimensional emissive array 51, fabricated using OLED or similar emissive components, can be employed for color or monochrome printing within printing apparatus 10. Referring to FIG. 2, imaging optics 58 directs modulated light from two-dimensional emissive array 51 to form exposing image 60 for exposing photosensitive medium 22 (not shown in FIG. 2). Imaging optics 58 can be a magnifying or demagnifying print lens. When two-dimensional emissive array 51 is driven by a set of image data, exposing image 60 is a magnified, a 1:1, or a demagnified copy, respectively, of the image displayed by two-dimensional emissive array 51. Where two-dimensional emissive array 51 provides a color image, exposing image 60 will also have color content. Where two-dimensional emissive array 51 provides a monochrome image, exposing image 60 will be a monochrome image. It would be possible, then, to match a suitable type of photosensitive medium 22 with two-dimensional emissive array 51 for a simple, compact monochrome or color printing device. In the case that a color emissive array 51 is used with a monochrome media, only the array elements with light emission matching the media response are driven, effectively providing a printing device that is selectable in light color, with no needed hardware changes.

Figure 10A:
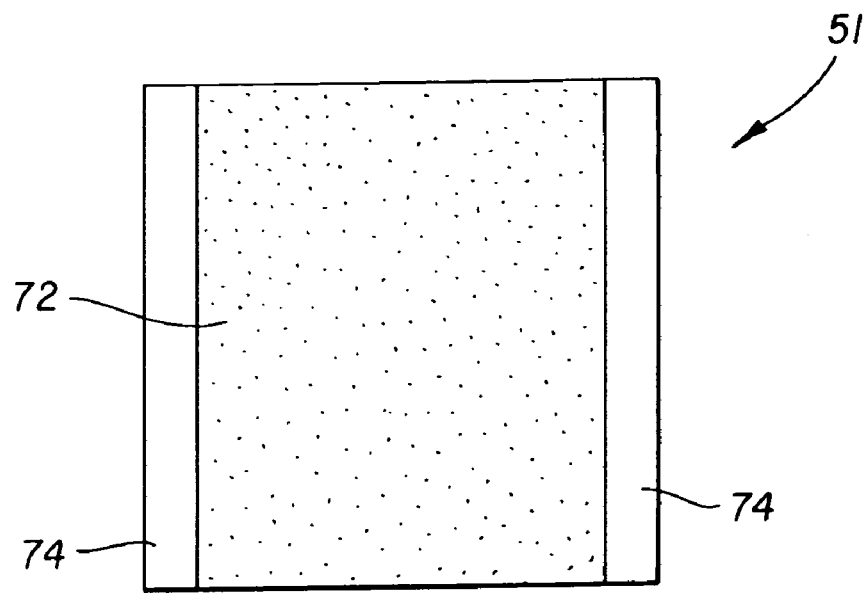
FIG. 10a is a perspective view showing how array elements of a two-dimensional emissive array are selectively driven as a group to display an image in "portrait" mode.
Figure 10B:
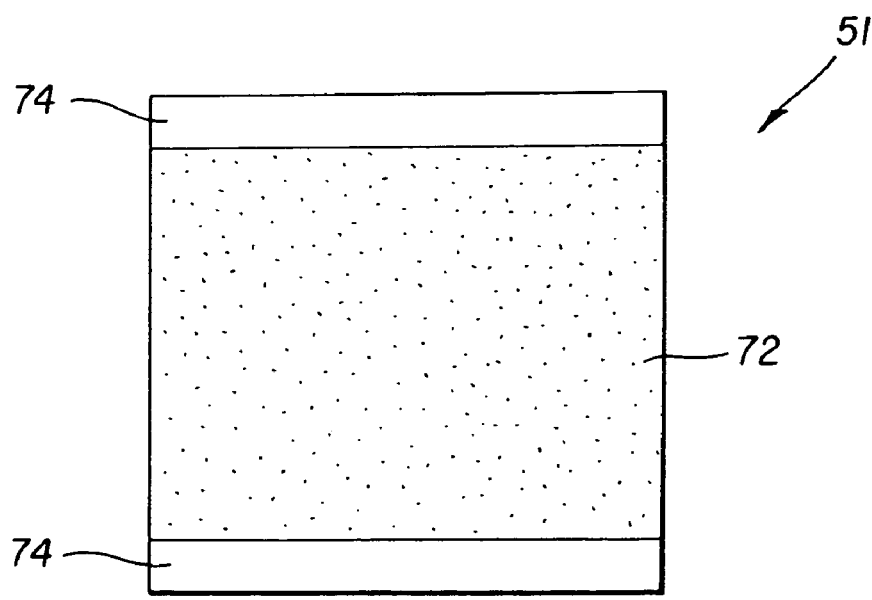
FIG. 10b is a perspective view showing how array elements of a two-dimensional emissive array are selectively driven as a group to display an image in "landscape" mode.

For many types of photosensitive film, and for different imaging applications, specific dimensional formats are needed. Because of the one-to-one pixel correspondence between the image formed by two-dimensional emissive array 51 and exposing image 60, different groupings of array pixel elements can be driven to provide exposing image 60 in the desired print format, having a specific height:width aspect ratio. In this way, multiple-format printing is achieved without any increase in hardware complexity. For example, as shown in FIG. 10*a*, two-dimensional emissive array 51 is used to print in the "portrait" mode when pixels comprising an activated array element group 72, represented as the shaded area in FIG. 10*a*, are driven with image data while an inactive array element group 74, represented in the unshaded area, are left undriven. FIG. 10*b* illustrates the parallel case when emissive array 51 is used to print in the "landscape" mode. In some cases, two-dimensional emissive array 51 may have a sufficient number of pixels to allow forming multiple images at the same time. For example, referring to FIG. 3, there is shown an arrangement whereby one two-dimensional emissive array 51 is driven to form a 2-up, or duplex, exposing image 60, comprising two smaller side-by-side images. Other printing arrangements of multiple images are similarly possible by appropriately varying the driving schemes for two-dimensional emissive array 51.

Multiple-Array Printing

Figure 4:
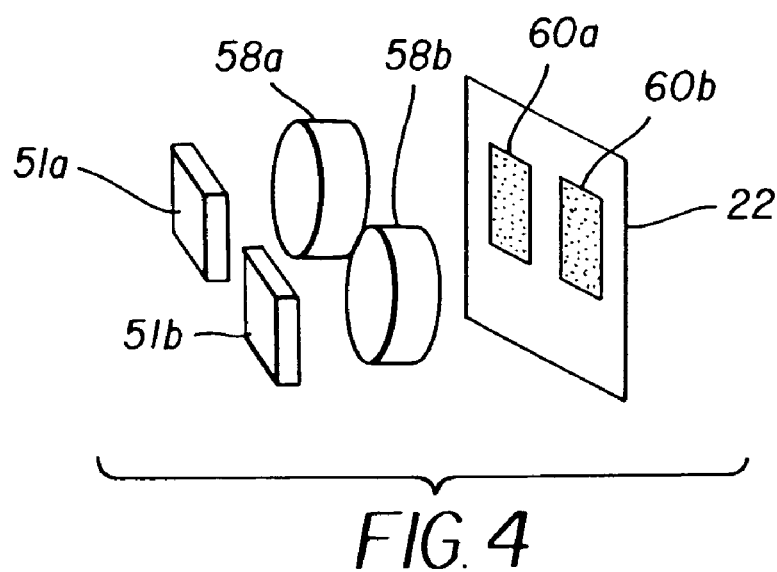
FIG. 4 is a perspective view showing use of two emissive arrays for simultaneous imaging onto the same media.

The use of multiple two-dimensional emissive arrays 51 can also have advantages for improving image quality, increasing the dimensions of the imageable area, and increasing pixel density. As one example, FIG. 4 shows the use of a pair of two-dimensional emissive arrays 51*a* and 51*b* to allow two exposing images 60*a* and 60*b* to be written at the same time. Separate imaging optics 58*a* and 58*b* can be used for the two emissive arrays 51*a* and 51*b*, as shown. Alternatively, both emissive arrays 51*a* and 51*b* could form separate exposing images through a single, larger imaging optics 58 (not shown). A 2-up exposing image results in both cases, such as in FIG. 3, with higher pixel density.

Figure 5:
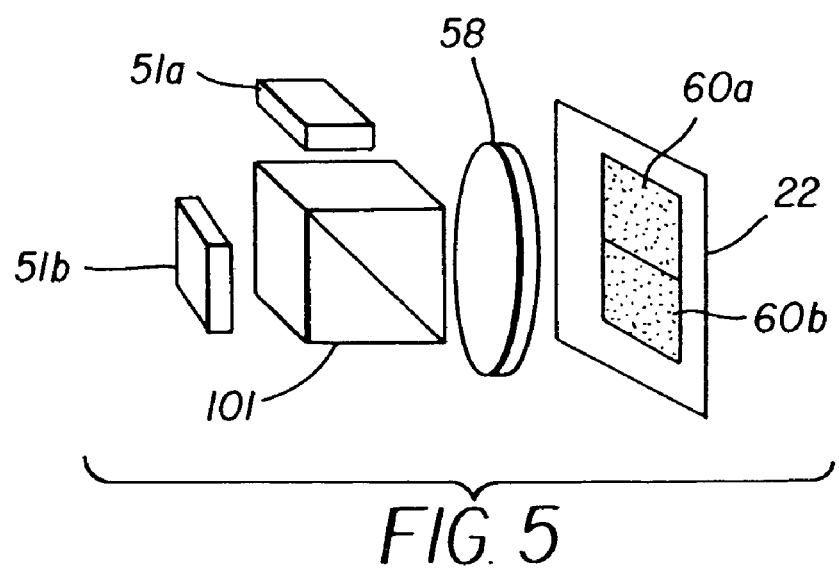
FIG. 5 is a perspective view showing how the output from two or more emissive devices can be combined.
Figure 6:
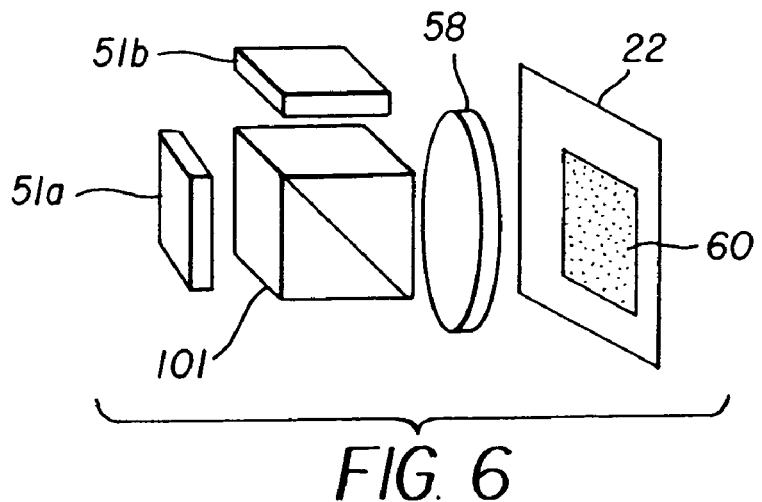
FIG. 6 is a perspective view showing how the output from two or more emissive devices can be interleaved to boost image resolution.

Referring to FIG. 5, the deployment of multiple two-dimensional emissive arrays 51*a* and 51*b* for increasing image area without any loss in print resolution is shown. By means of a beam combiner 101, such as a beamsplitter cube, multiple exposing images 60*a* and 60*b* are abutted, thereby stitching together separate images to form a larger, composite image. The arrangement of FIG. 4 could alternately be used to obtain the same "image-stitching" or tiling effect; however, the use of beam combiner 101 eliminates the need for separate imaging optics 58 for each two-dimensional emissive array 51. Referring to FIG. 6, similar deployment of two-dimensional emissive arrays 51a and 51b is used to effect increased pixel density for exposing image 60 as a composite image. By interleaving pixels formed from two-dimensional emissive arrays 51a and 51b, the effective pixel density and, therefore, print resolution, of composite exposing image 60 can be doubled in each dimension.

Figure 7:
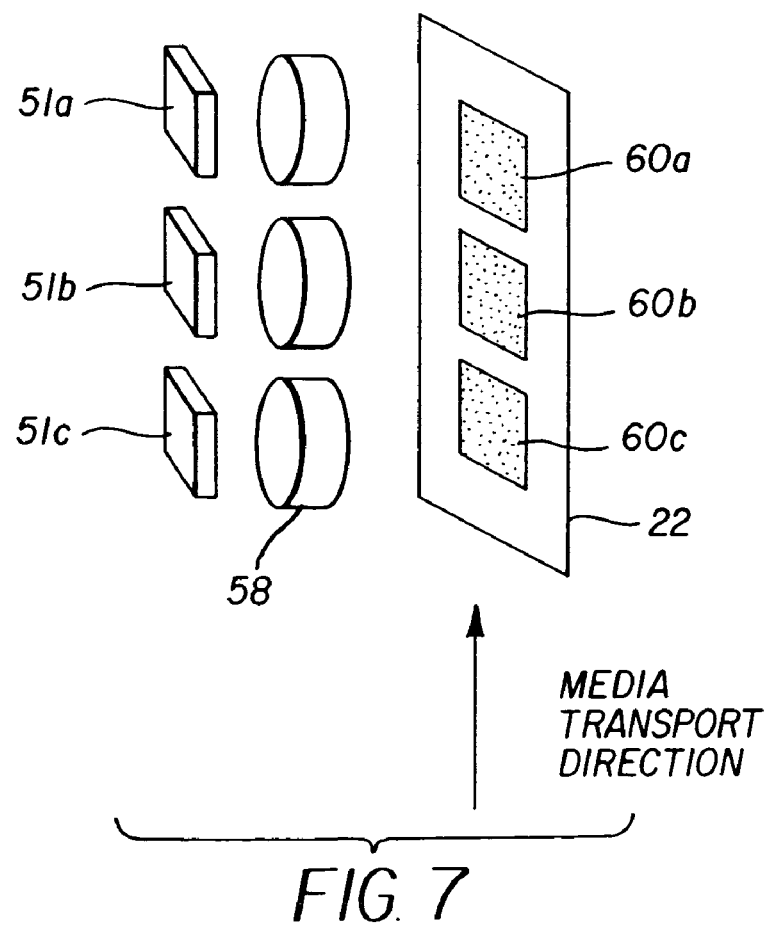
FIG. 7 is a perspective view showing how the output from two or more emissive devices can be used for printing images at increased productivity.

The use of multiple two-dimensional emissive arrays 51 can also help to boost productivity of printing apparatus 10. Referring to FIG. 7, three two-dimensional emissive arrays 51a, 51b, and 51c are juxtaposed in series along the direction of media transport. With this arrangement, two-dimensional emissive arrays 51a, 51b, and 51c image simultaneously onto photosensitive medium 22 to produce three exposing images at a time: 60a, 60b, and 60c, respectively. Printing three exposing images 60a, 60b, and 60c at one time in this manner effectively triples the print rate of printing apparatus 10.

Figure 8:
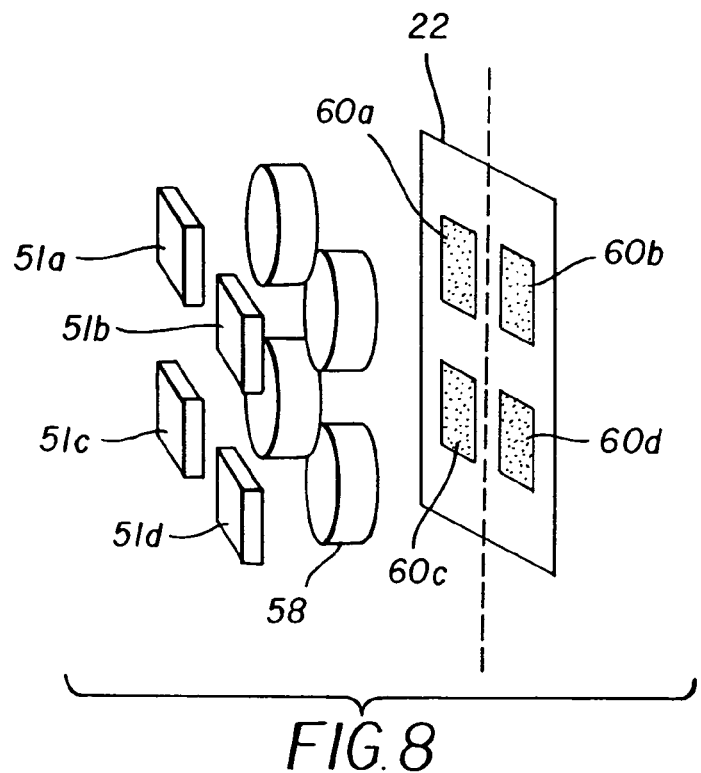
FIG. 8 is a perspective view showing how the output from four or more emissive devices can be used for efficient simultaneous printing of images.

A matrix of emissive arrays can likewise be used to substantially increase throughput productivity, such as where large-width media is used, for example. One embodiment using a matrix arrangement is shown in FIG. 8. A 2-by-2 matrix of emissive arrays 51a, 51b, 51c, and 51d, each driven with image data, simultaneously prints four image frames 60a, 60b, 60c, and 60d, respectively onto a wide width photosensitive medium 22. Alternately, two narrower segments of photosensitive medium 22, placed side-by-side, can be used at the imaging plane, separated by the dotted line shown in FIG. 8. In this case, referring back to FIG. 1, media supply canister 41 may be adapted to accept two media rolls, of the same or of different widths, and to simultaneously supply both media segments. Media transport apparatus 38 and media take-up canister 42 can be similarly adapted to cooperate with media supply canister 41 to provide simultaneous imaging at photosensitive medium 22. FIGS. 7 and 8 have shown two of the many possible arrangements whereby multiple two-dimensional emissive arrays are deployed for simultaneous printing of multiple exposing images 60. Other embodiments could allow the use of beam-splitting and/or beam-combining elements with multiple two-dimensional emissive arrays 51, for example, to effect productivity gains. In all cases where multiple two-dimensional emissive arrays 51 are used, the image processing utilities within control logic processor 12 direct the processed image data to the respective emissive arrays as separate image frames.

Dithered Printing

In an alternative embodiment of printer 10, dithering may be used to increase the inherent array resolution and to compensate for array element defects. A dithering pattern for two-dimensional emissive array 51 is shown in FIGS. 11a–11d.

Figure 11A:
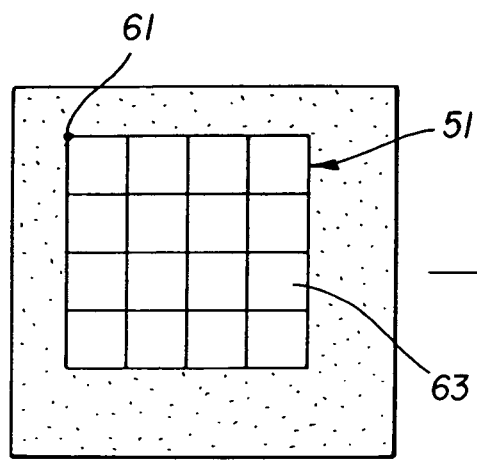
FIGS. 11a–11c illustrate the effect of dithering a two-dimensional emissive array using four distinct image positions.
Figure 11B:
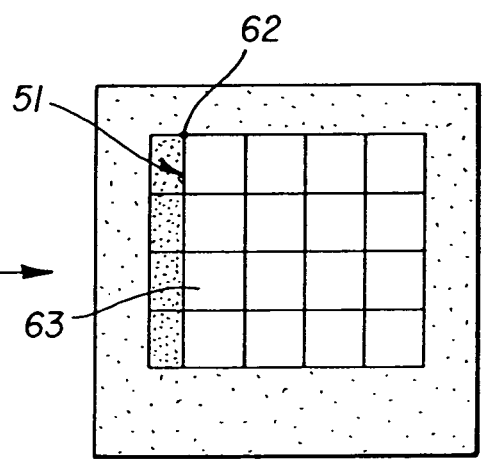
Figure 11C:
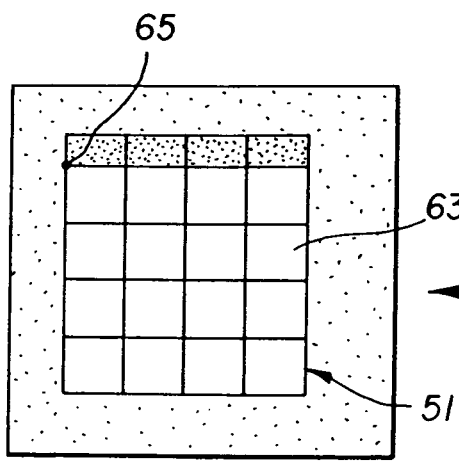
Figure 11D:
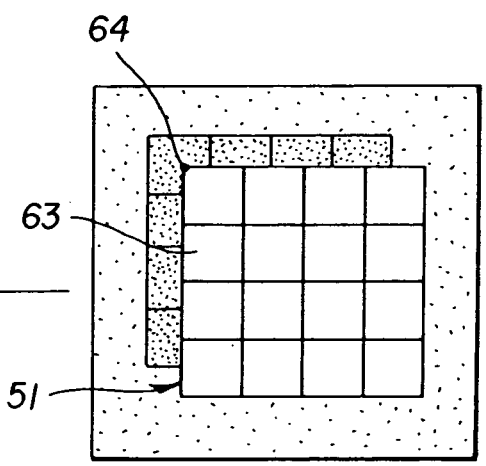

In this application, dithering is effected by imaging two-dimensional emissive array 51 at one position, repositioning two-dimensional emissive array 51 a fraction of an array element 63 distance away, then re-imaging. In so doing, multiple images are created and overlapped. By overlapping multiple images, the system acquires a redundancy that compensates for array element failure or drop out. Furthermore, by interpolating and updating the data between positions, the effective resolution of printing apparatus 10 is increased. Referring to the example dithering scheme depicted in FIGS. 11a–11d, two-dimensional emissive array 51 is first positioned at a first array element position 61, then two-dimensional emissive array 51 is imaged (FIG. 11a). Two-dimensional emissive array 51 is then moved to a second array element position 62 (FIG. 11b) which is one half of an array element, that is, one half pixel, laterally displaced from first array element position 61. Two-dimensional emissive array 51 is then imaged at second array element position 62. Next, two-dimensional emissive array 51 is displaced by one half of a modulator site longitudinally from previous second array element position 62, which means it is diagonally displaced from first array element position 61 to a third array element position 64 (FIG. 11d). Two-dimensional emissive array 51 is then imaged and photosensitive medium 22 exposed again. Two-dimensional emissive array 51 is then moved to a fourth array element position 65 that is laterally displaced from third array element position 64 (FIG. 11c). Photosensitive medium 22 is then exposed at this position. Using this pattern, there is effectively a fourfold increase in the amount of data written. This serves to increase image resolution and provide means to further sharpen images.

Figure 9:
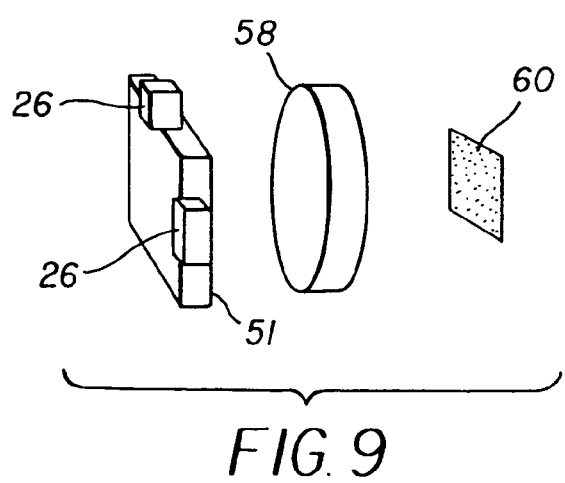
FIG. 9 is a perspective view showing an arrangement for providing dithering.

Referring to FIG. 9, there is shown a dithering arrangement in which one or more actuators 26 move two-dimensional emissive array 51 some fraction of a pixel distance in at least one direction for achieving dithering effects illustrated in the sequence of FIGS. 11a–11d. Actuator 26 can be a piezoelectric actuator or other mechanical actuator, for example. Dithering effects can be similarly obtained using actuators 26 to move one or more two-dimensional emissive arrays 51 in any of the writing configurations shown in FIGS. 2 through 8.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. As is noted above, one embodiment uses OLED devices, a grouping which comprises both small-molecule and polymer-based (PLED) devices. Other types of two-dimensional emissive array 51 could be used, including devices based on inorganic light emitting diodes, for example. A number of imaging optics 58 arrangements are possible, using techniques well known in the imaging arts. Both monochrome and color exposing images 60 could be formed.

Photosensitive medium 22 could be film, paper, or some other image receiving medium. The latent image formed thereon could be formed directly upon printing or could be developed using conventional chemical bath development, using thermal energy, or using some other method.

Thus, what is provided is a printing apparatus 10 for printing an image from a digital image source onto photosensitive medium 22 in a suitable format, using one or more two-dimensional emissive arrays 51.

| PARTS LIST | |
|---|---|
| 10 | Printing apparatus |
| 12 | Control logic processor |
| 16 | Image data stream |
| 18 | Print commands |
| 20 | Identifier |
| 22 | Photosensitive medium |
| 26 | Actuator |
| 36 | Exposure area |
| 38 | Media transport apparatus |
| 41 | Media supply canister |

-continued

PARTS LIST

| 42 | Media take-up canister |
|---|---|
| 51 | Two-dimensional emissive array |
| 51a | Two-dimensional emissive array |
| 51b | Two-dimensional emissive array |
| 51c | Two-dimensional emissive array |
| 51d | Two-dimensional emissive array |
| 58 | Imaging optics |
| 58a | Imaging optics |
| 58b | Imaging optics |
| 60 | Exposing image |
| 60a | Exposing image |
| 60b | Exposing image |
| 60c | Exposing image |
| 60d | Exposing image |
| 61 | First array element position |
| 62 | Second array element position |
| 63 | Array elements |
| 64 | Third array element position |
| 65 | Fourth array element position |
| 72 | Activated array element group |
| 74 | Inactive array element group |
| 80 | Sensor |
| 101 | Beam combiner |

What is claimed is:

1. An apparatus for printing an image from digital data onto a photosensitive medium, the apparatus comprising:
    (a) a control logic processor for accepting an image data input stream and providing image pixel data for a two-dimensional image;
    (b) a light emissive array for forming a two-dimensional exposure image according to said image pixel data, said light emissive array comprising a plurality of individual light-emitting elements arranged in multiple rows and columns, wherein each said light-emitting element corresponds to a pixel in said image pixel data, an intensity of each said light emitting element varying according to the digital data value for each said pixel;
    (c) imaging optics for directing said two-dimensional exposure image onto the photosensitive medium; and
    further comprising an actuator to offset the position of said light-emissive array relative to the position of said photosensitive medium for dithering.

2. An apparatus for printing an image from digital data according to claim 1 wherein said actuator is a piezoelectric actuator.

3. An apparatus for printing an image from digital data according to claim 1 wherein said light emissive array is a monochromatic device.

4. An apparatus for printing an image from digital data according to claim 1 wherein said light emissive array is a color device.

5. An apparatus for printing an image from digital data according to claim 1 wherein said control logic processor provides color correction.

6. An apparatus for printing an image from digital data according to claim 1 wherein said control logic processor provides aperture correction.

7. An apparatus for printing an image from digital data according to claim 1 wherein said control logic processor provides tone scale correction.

8. An apparatus for printing an image from digital data according to claim 1 wherein said control logic processor provides uniformity correction.

9. An apparatus for printing an image from digital data according to claim 1 wherein said control logic processor provides file format conversion for said image data stream.

10. An apparatus for printing a plurality of images from digital image pixel data onto a photosensitive medium, the apparatus comprising:
    (a) a control logic processor for accepting an image data input stream and providing image pixel data for at least one two-dimensional image;
    (b) a first light emissive array for forming a first exposure image according to the digital image pixel data;
    (c) a second light emissive array for forming a second exposure image according to the digital image pixel data;
    wherein said first and said second light emissive arrays each comprise a plurality of individual light-emitting elements arranged in multiple rows and columns, wherein each said light-emitting element corresponds to a pixel in the digital image pixel data, the intensity of each said light emitting element varying according to the digital data value for each said pixel;
    (d) first imaging optics for directing said first exposure image onto the photosensitive medium;
    (e) second imaging optics for directing said second exposure image onto the photosensitive medium; and
    further comprising an actuator to offset the position of said first light-emissive array relative to the position of said photosensitive medium for dithering.

11. An apparatus for printing a plurality of images from digital data according to claim 10 further comprising a sensor in communication with said control logic processor for sensing a dimension of the photosensitive medium.

12. An apparatus for printing a plurality of images from digital data according to claim 11 wherein said sensor senses an electromagnetic signal.

13. An apparatus for printing a plurality of images from digital data according to claim 11 wherein said sensor senses an optical encoding.

14. An apparatus for printing a plurality of images from digital data according to claim 11 wherein said sensor senses a magnetic encoding.

15. An apparatus for printing a plurality of images from digital data according to claim 10 wherein said first light emissive array comprises organic light-emitting diodes.

16. An apparatus for printing a plurality of images from digital data according to claim 10 wherein said first light emissive array comprises inorganic light-emitting diodes.

17. An apparatus for printing a plurality of images from digital data according to claim 10 wherein said photosensitive medium is a film.

18. An apparatus for printing a plurality of images from digital data according to claim 10 wherein said photosensitive medium comprises paper.

19. An apparatus for printing a plurality of images from digital data according to claim 10 wherein said actuator is a piezoelectric actuator.

20. An apparatus for printing an image from digital data according to claim 10 wherein said first light emissive array and said second light emissive array are monochromatic devices.

21. An apparatus for printing an image from digital data according to claim 10 wherein said first light emissive array and said second light emissive array are color devices.

22. An apparatus for printing an image from digital data according to claim 10 wherein said control logic processor provides color correction.

23. An apparatus for printing an image from digital data according to claim 10 wherein said control logic processor provides aperture correction.

24. An apparatus for printing an image from digital data according to claim 10 wherein said control logic processor provides tone scale correction.

25. An apparatus for printing an image from digital data according to claim 10 wherein said control logic processor provides uniformity correction.

26. An apparatus for printing an image from digital data according to claim 10 wherein said control logic processor provides file format conversion.

27. An apparatus for printing an image from digital image pixel data onto a photosensitive medium, the apparatus comprising:
 (a) a control logic processor for accepting an image data input stream and providing image pixel data for at least one two-dimensional image;
 (b) a first light emissive array for forming a first portion of an exposure image according to the digital data;
 (c) a second light emissive array for forming a second portion of said exposure image according to the digital data;
 wherein said first and said second light emissive arrays each comprise a plurality of individual light-emitting elements arranged in multiple rows and columns, wherein each said light-emitting element corresponds to a pixel in the digital data, the intensity of each said light emitting element varying according to the digital data value for each said pixel;
 (d) combining means for combining said first and second portions of said exposure image to form a complete exposure image;
 (e) imaging optics for directing said complete exposure image onto the photosensitive medium; and
 further comprising an actuator to offset the position of said first light-emissive array relative to the position of said photosensitive medium for dithering.

28. An apparatus for printing an image from digital data according to claim 27 wherein said actuator is a piezoelectric actuator.

29. An apparatus for printing an image according to claim 27 wherein said first light emissive array and said second light emissive array are monochromatic devices.

30. An apparatus for printing an image according to claim 27 wherein said first light emissive array and said second light emissive array are color devices.

31. An apparatus for printing an image according to claim 27 wherein said control logic processor provides color correction.

32. An apparatus for printing an image according to claim 27 wherein said control logic processor provides aperture correction.

33. An apparatus for printing an image according to claim 27 wherein said control logic processor provides tone scale correction.

34. An apparatus for printing an image according to claim 27 wherein said control logic processor provides uniformity correction.

35. An apparatus for printing an image according to claim 27 wherein said control logic processor provides file format conversion.

36. An apparatus for printing an image from digital image pixel data onto a photosensitive medium, the apparatus comprising:
 (a) a control logic processor for accepting an image data input stream and providing image pixel data for at least one two-dimensional image;
 (b) a first light emissive array for forming a first portion of an exposure image according to the digital data;
 (c) a second light emissive array for forming a second portion of said exposure image according to the digital data;
 wherein said first and said second light emissive arrays each comprise a plurality of individual light-emitting elements arranged in multiple rows and columns, wherein each said light-emitting element corresponds to a pixel in the digital data, the intensity of each said light emitting element varying according to the digital data value for each said pixel;
 (d) combining means for combining said first and second portions of said exposure image to form a complete exposure image;
 (e) imaging optics for directing said complete exposure image onto the photosensitive medium; and
 wherein said combining means substantially overlaps said first portion of said exposure image with said second portion of said exposure image, such that pixels associated with said first light emissive array are thereby interleaved with pixels associated with said second light emissive array.

37. An apparatus for printing capable of simultaneously exposing multiple images from digital data onto a first and a second segment of a photosensitive medium, the apparatus comprising:
 (a) a media supply adapted to supply said first and second segments of photosensitive media, said first segment of photosensitive media having a first width dimension, and said second segment of photosensitive media having a second width dimension;
 (b) a control logic processor for accepting an image data input stream and providing image pixel data for the multiple images;
 (c) a first light emissive array and a second light emissive array for forming, according to said image pixel data, first and second two-dimensional exposure images respectively, each said light emissive array comprising a plurality of individual light-emitting elements, wherein each said light-emitting element corresponds to a pixel in the digital data, the intensity of each said light emitting element varying according to the digital data value for each said pixel;
 (d) a first imaging optics assembly and a second imaging optics assembly for directing said first and second two-dimensional exposure images respectively onto said first and second segments of photosensitive media; and
 (e) transport means for indexing said first and said second segments of photosensitive media for simultaneous exposure from said first and said second light emissive arrays and for moving said first and said second segments of photosensitive media to a next indexed area.

38. An apparatus for printing capable of simultaneously exposing multiple images from digital data onto a first and a second segment of a photosensitive medium, the apparatus comprising:
 (a) a media supply adapted to supply said first and second segments of photosensitive media, said first segment of photosensitive media having a first width dimension, and said second segment of photosensitive media having a second width dimension;

(b) a control logic processor for accepting an image data input stream and providing image pixel data for the multiple images;

(c) a first light emissive array and a second light emissive array for forming, according to said image pixel data, first and second two-dimensional exposure images respectively, each said light emissive array comprising a plurality of individual light-emitting elements, wherein each said light-emitting element corresponds to a pixel in the digital data, the intensity of each said light emitting element varying according to the digital data value for each said pixel;

(d) a first imaging optics assembly and a second imaging optics assembly for directing said first and second two-dimensional exposure images respectively onto said first and second segments of photosensitive media;

(e) transport means for indexing said first and said second segments of photosensitive media for simultaneous exposure from said first and said second light emissive arrays and for moving said first and said second segments of photosensitive media to a next indexed area; and further comprising an actuator to offset the position of said first light-emissive array relative to the position of said photosensitive medium for dithering.

39. An apparatus for printing according to claim 38 wherein said media supply accepts multiple media rolls.

40. An apparatus for printing according to claim 38 further comprising a sensor in communication with a control logic processor for sensing a dimension of said first segment of photosensitive medium.

41. An apparatus for printing according to claim 38 wherein said sensor senses an electromagnetic signal.

42. An apparatus for printing according to claim 38 wherein said sensor senses an optical encoding.

43. An apparatus for printing according to claim 38 wherein said sensor senses a magnetic encoding.

44. An apparatus for printing according to claim 38 wherein said first light emissive array comprises organic light-emitting diodes.

45. An apparatus for printing according to claim 38 wherein said first light emissive array comprises inorganic light-emitting diodes.

46. An apparatus for printing according to claim 38 wherein said photosensitive medium is a film.

47. An apparatus for printing according to claim 38 wherein said photosensitive medium comprises paper.

48. An apparatus for printing according to claim 38 wherein said actuator is a piezoelectric actuator.

49. An apparatus for printing according to claim 38 further comprising an image processing subsystem for processing the digital image pixel data and directing the processed digital image pixel data to said first and second light emissive arrays.

50. An apparatus for printing according to claim 38 wherein said image processing subsystem provides color correction.

51. An apparatus for printing according to claim 38 wherein said image processing subsystem provides aperture correction.

52. An apparatus for printing according to claim 38 wherein said image processing subsystem provides tone scale correction.

53. An apparatus for printing according to claim 38 wherein said image processing subsystem provides uniformity correction.

54. An apparatus for printing according to claim 38 wherein said image processing subsystem provides file format conversion for said image data input stream.

55. An apparatus for printing according to claim 38 wherein said first emissive array is a monochromatic device.

56. An apparatus for printing according to claim 38 wherein said first emissive array is a color device.

57. An apparatus for printing according to claim 38 wherein said first and second light emissive arrays are juxtaposed with respect to each other along the direction of motion of said media transport.

58. An apparatus for printing according to claim 38 wherein said first and second light emissive arrays are displaced in a matrix configuration.

59. A method of printing, according to a predetermined format, at least one two-dimensional image from digital image pixel data using a light-emissive array, comprising a plurality of light-emitting elements arranged in multiple rows and columns, onto a photosensitive medium, the method comprising:

(a) correlating, to at least one two-dimensional image, a grouping of light-emitting elements on said light-emissive array, according to the predetermined format;

(b) forming at least one two-dimensional exposure image from said light emissive array by driving said grouping of light-emitting elements based on said digital image pixel data;

(c) directing said at least one two-dimensional exposure image onto the photosensitive medium for forming an image thereon;

wherein the step of correlating said grouping of light emitting elements comprises the step of obtaining a dimension of said photosensitive medium; and wherein the step of obtaining a dimension comprises the step of reading an electromagnetic signal.

60. A method of printing two-dimensional images according to claim 59 wherein the step of forming at least one two-dimensional exposure image comprises the step of activating an organic light-emitting diode array.

61. A method of printing two-dimensional images according to claim 59 wherein the step of forming at least one two-dimensional exposure image comprises the step of activating an inorganic light-emitting diode array.

62. A method of printing two-dimensional images according to claim 59 further comprising the step of transporting the photosensitive medium into position for receiving said exposure image.

63. A method of printing, according to a predetermined format, at least one two-dimensional image from digital image pixel data using a light-emissive array, comprising a plurality of light-emitting elements arranged in multiple rows and columns, onto a photosensitive medium, the method comprising:

(a) correlating, to at least one two-dimensional image, a grouping of light-emitting elements on said light-emissive array, according to the predetermined format;

(b) forming at least one two-dimensional exposure image from said light emissive array by driving said grouping of light-emitting elements based on said digital image pixel data;

(c) directing said at least one two-dimensional exposure image onto the photosensitive medium for forming an image thereon;

further comprising the step of driving an actuator coupled to said light emissive array to provide image dithering.

64. A method of simultaneously printing, onto a photosensitive medium, a plurality of two-dimensional images from digital image pixel data using a plurality of light-emissive arrays, each said light-emissive array comprising a plurality of light-emitting elements arranged in multiple rows and columns, the method comprising:
(a) selecting, from a set of available formats, a selected format;
(b) indexing the photosensitive medium to a position for simultaneous exposure;
(c) correlating a grouping of emissive elements on each of said plurality of light-emissive arrays with one of said two-dimensional images according to said selected format;
(d) simultaneously forming a two-dimensional exposure image from each of said plurality of light emissive arrays by driving each said grouping of emissive elements based on the digital image pixel data;
(e) directing each said two-dimensional exposure image from each of said plurality of light emissive arrays onto the photosensitive medium at said position;
wherein the step of selecting comprises the step of obtaining a dimension of the photosensitive medium; and
wherein the step of obtaining a dimension comprises the step of reading an electromagnetic signal.

65. A method of simultaneously printing a plurality of two-dimensional images according to claim 64 wherein the step of forming a two-dimensional exposure image comprises the step of activating an organic light-emitting diode array.

66. A method of simultaneously printing a plurality of two-dimensional images according to claim 64 wherein the step of forming a two-dimensional exposure image comprises the step of activating an inorganic light-emitting diode array.

67. A method of simultaneously printing a plurality of two-dimensional images according to claim 64 further comprising the step of providing the photosensitive medium in roll form.

68. A method of simultaneously printing a plurality of two-dimensional images according to claim 64 wherein said plurality of light-emissive arrays are disposed in juxtaposition with each other along the direction of motion of said media transport.

69. A method of simultaneously printing, onto a photosensitive medium, a plurality of two-dimensional images from digital image pixel data using a plurality of light-emissive arrays, each said light-emissive array comprising a plurality of light-emitting elements arranged in multiple rows and columns, the method comprising:
(a) selecting, from a set of available formats, a selected format;
(b) indexing the photosensitive medium to a position for simultaneous exposure;
(c) correlating a grouping of emissive elements on each of said plurality of light-emissive arrays with one of said two-dimensional images according to said selected format;
(d) simultaneously forming a two-dimensional exposure image from each of said plurality of light emissive arrays by driving each said grouping of emissive elements based on the digital image pixel data;
(e) directing each said two-dimensional exposure image from each of said plurality of light emissive arrays onto the photosensitive medium at said position; and
further comprising the step of driving an actuator coupled to at least one of said plurality of light emissive arrays to provide image dithering.

70. A method of simultaneously printing, onto a photosensitive medium, a plurality of two-dimensional images from digital image pixel data using a plurality of light-emissive arrays, each said light-emissive array comprising a plurality of light-emitting elements arranged in multiple rows and columns, the method comprising:
(a) selecting, from a set of available formats, a selected format;
(b) indexing the photosensitive medium to a position for simultaneous exposure;
(c) correlating a grouping of emissive elements on each of said plurality of light-emissive arrays with one of said two-dimensional images according to said selected format;
(d) simultaneously forming a two-dimensional exposure image from each of said plurality of light emissive arrays by driving each said grouping of emissive elements based on the digital image pixel data;
(e) directing each said two-dimensional exposure image from each of said plurality of light emissive arrays onto the photosensitive medium at said position;
wherein said plurality of light-emissive arrays are displaced in a matrix configuration.

71. A method of printing a two-dimensional image from digital image pixel data onto a photosensitive medium comprising:
(a) forming a first portion of an exposure image from a first light emissive array;
(b) forming a second portion of said exposure image from a second light emissive array;
(c) combining said first and second portions of said exposure image to form a composite exposure image;
(d) directing said composite exposure image onto the photosensitive medium;
(e) obtaining a dimension of the photosensitive medium;
(f) selecting a print format from a set of available print formats, based on said dimension; and
wherein the step of obtaining a dimension comprises the step of reading an electromagnetic signal.

72. A method of printing two-dimensional images according to claim 71 wherein the step of forming said first portion of an exposure image comprises the step of activating an organic light-emitting diode array.

73. A method of printing two-dimensional images according to claim 71 wherein the step of forming said first portion of an exposure image comprises the step of activating an inorganic light-emitting diode array.

74. A method of printing a two-dimensional image from digital image pixel data onto a photosensitive medium comprising:
(a) forming a first portion of an exposure image from a first light emissive array;
(b) forming a second portion of said exposure image from a second light emissive array;
(c) combining said first and second portions of said exposure image to form a composite exposure image;
(d) directing said composite exposure image onto the photosensitive medium; and
further comprising the step of driving a first actuator coupled to said first light emissive array and of driving a second actuator coupled to said second light emissive array to provide image dithering.

75. A method of printing a two-dimensional image from digital image pixel data onto a photosensitive medium comprising:
(a) forming a first portion of an exposure image from a first light emissive array;
(b) forming a second portion of said exposure image from a second light emissive array;
(c) combining said first and second portions of said exposure image to form a composite exposure image;
(d) directing said composite exposure image onto the photosensitive medium; and
wherein the step of combining said first and second portions comprises stitching said first and second portions.

76. A method of printing a two-dimensional image from digital image pixel data onto a photosensitive medium comprising:
(a) forming a first portion of an exposure image from a first light emissive array;
(b) forming a second portion of said exposure image from a second light emissive array;
(c) combining said first and second portions of said exposure image to form a composite exposure image;
(d) directing said composite exposure image onto the photosensitive medium; and
wherein the step of combining said first and second portions comprises interleaving pixels from said first portion with pixels from said second portion.

* * * * *